(No Model.) 2 Sheets—Sheet 1.

J. J. O'NEILL.
CIGAR CUTTER AND LIGHTER.

No. 531,855. Patented Jan. 1, 1895.

WITNESSES:
Fred White
T. T. Wallace

INVENTOR:
John J. O'Neill,
By his Attorneys,
Arthur O. Fraser & Co.

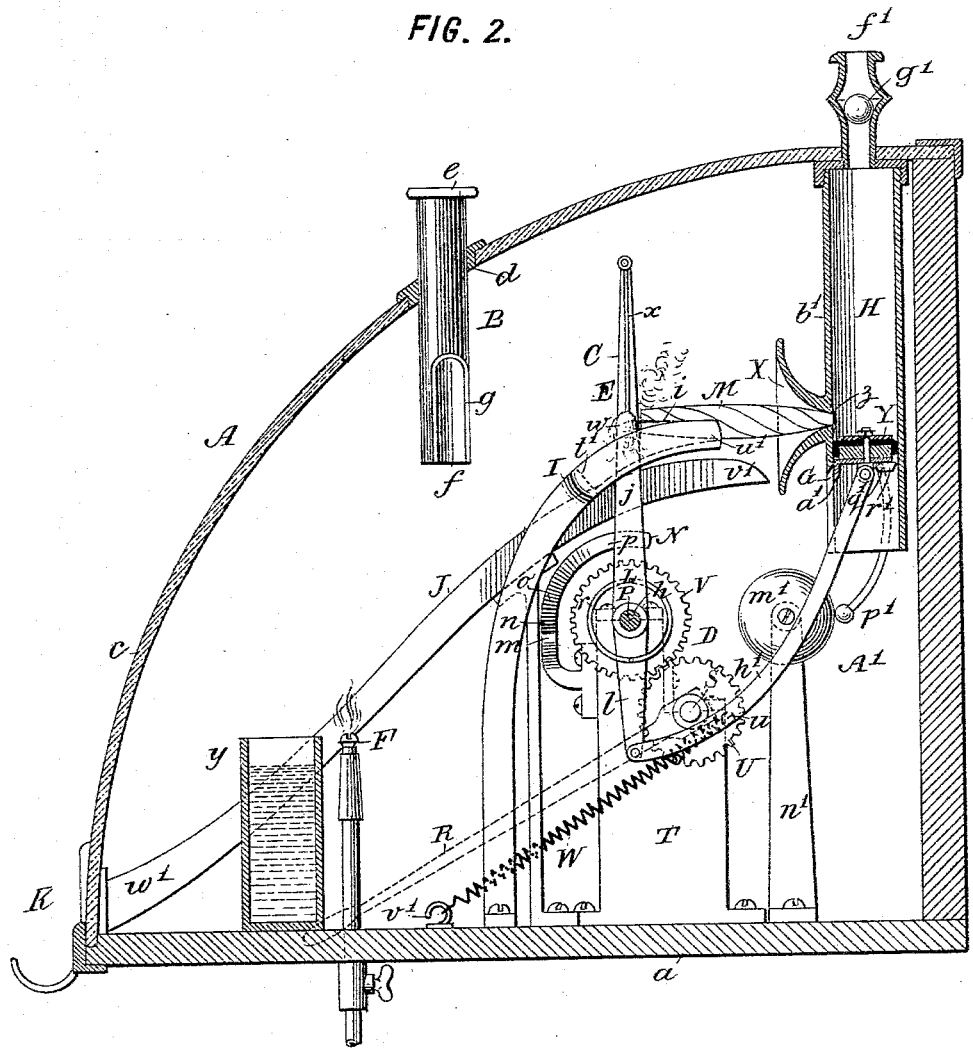

UNITED STATES PATENT OFFICE.

JOHN J. O'NEILL, OF NEW YORK, N. Y.

CIGAR CUTTER AND LIGHTER.

SPECIFICATION forming part of Letters Patent No. 531,855, dated January 1, 1895.

Application filed March 9, 1894. Serial No. 502,953. (No model.)

*To all whom it may concern:*

Be it known that I, JOHN J. O'NEILL, a citizen of the United States, residing in the city, county, and State of New York, have invented certain new and useful Improvements in Cigar Cutters and Lighters, of which the following is a specification.

This invention relates to cigar cutters and lighters, and aims to provide a device for automatically or mechanically cutting the tip from and lighting a cigar.

To this end in carrying out the preferred form of my invention, I provide a carrier for receiving and manipulating the cigar, a lighter for the latter, a cutter for removing the tip from the cigar, and a draft inducer for creating the draft necessary to ignite the cigar.

The apparatus also comprises means for disengaging and delivering the lighted cigar, an annunciator indicating the completion of the lighting operation, and means for discharging a puff of smoke after the lighting.

Figure 1:
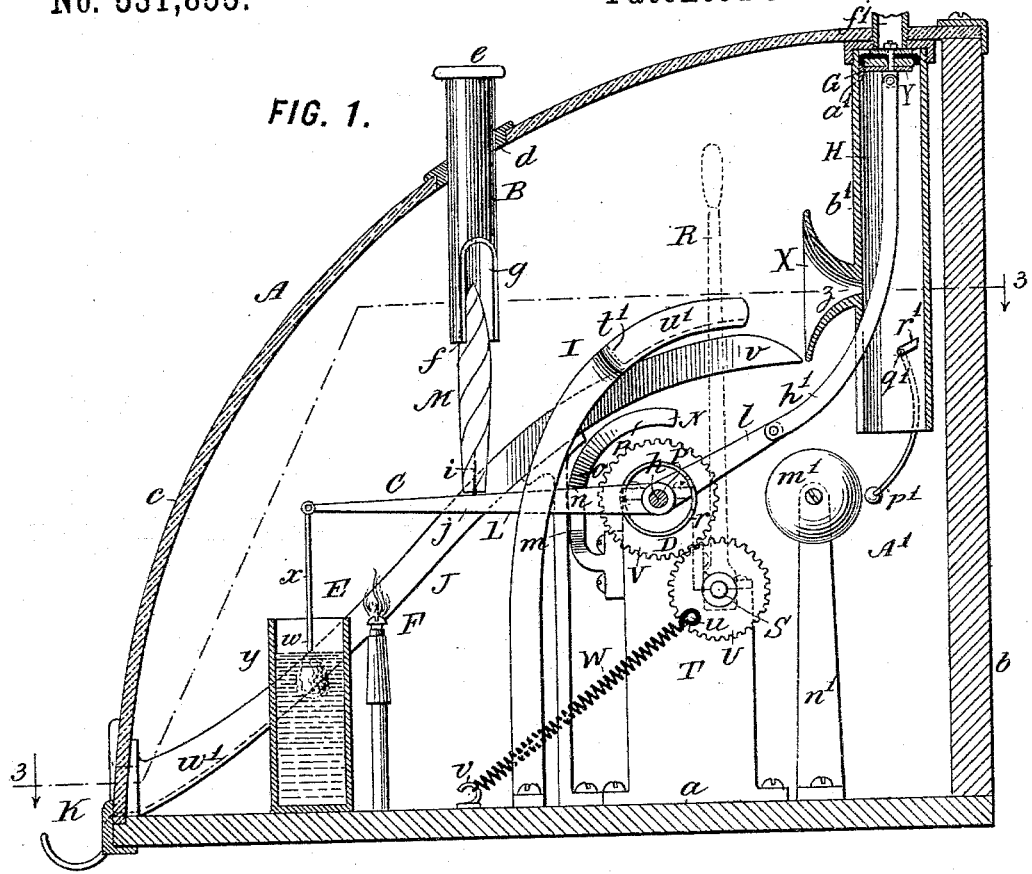
Figure 3:
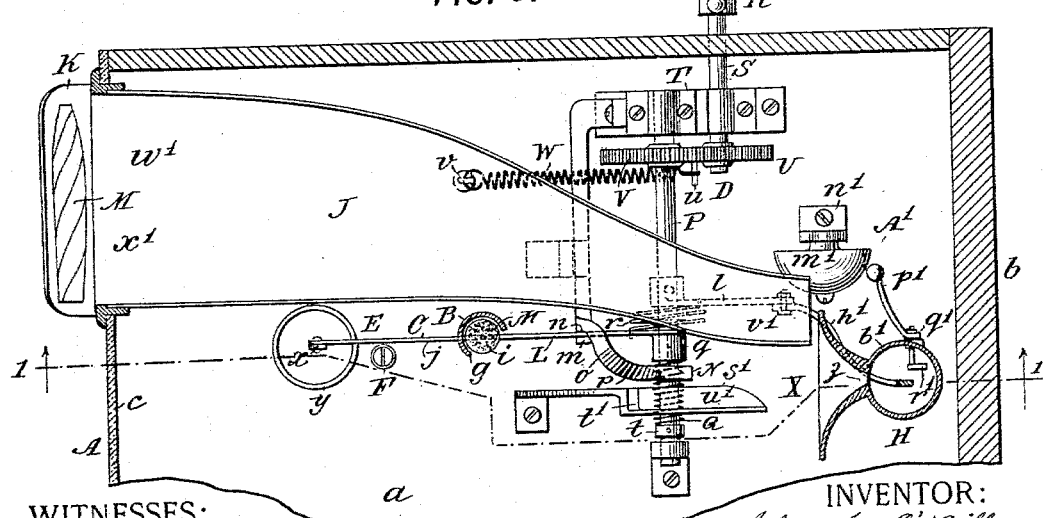

In the accompanying drawings which illustrate the preferred adaptation of my present invention, Figure 1 is a vertical cross-section of the apparatus shown in the cigar receiving or inactive position. Fig. 2 is a similar view showing the apparatus in the lighting position; and Fig. 3 is a plan view partly in section in the planes of the line 3—3 in Fig. 1.

Referring to the drawings, let A indicate an inclosing casing; B, a cigar receiver or chute; C, the cigar carrier; D, operating mechanism for the latter; E, the cigar lighter; F, an igniter therefor; G, the tip cutter; H, the draft inducer; I, the disengaging apparatus; J, the delivery chute for the cigar, and K the outer lip thereof.

The casing A may be of any suitable construction. That shown is in the form of a show case having bottom board $a$, back $b$, and a convex glass front $c$ through which the internal mechanism may be seen.

The chute B is preferably a cylindrical tube, internally large enough to permit the passage of the largest size of cigar passing through an aperture $d$ in the wall $c$, having an entrance mouth $e$, and terminating in a discharge end $f$, having in the construction shown a lateral cut away portion $g$ at one side. The end $f$ is preferably directly over the cigar receiving portion of the carrier C when the latter is in the receiving position, and its lowermost extremity is semi-circular in cross-section and depends toward the carrier to within a distance therefrom less than the minimum length of the smallest sizes of cigars.

The cut away portion $g$ of the chute extends upwardly above the carrier to a distance exceeding the maximum length of the largest sizes of cigars, and its width is sufficient to permit the lateral displacement of any cigar passing through the chute after being engaged by the carrier and during the movement of the latter.

The carrier receives and retains the cigar during the cutting and lighting operations. In the construction shown it consists of a movable part having a cigar retaining device catching the cigar from the chute B and holding it while being cut and lighted, and subsequently delivering it. The carrier preferably consists of a lever L mounted to tilt on its axis $h$, standing normally in the horizontal position, and carrying a needle $i$ which when the carrier is in this position is disposed in vertical position axially beneath the chute B, where as the cigar is dropped head first through the chute, its head end becomes impaled upon the needle, and it is thus retained by the carrier as seen in the drawings, in which M represents the cigar. The lever L here shown consists of a thin bar having long front arm $j$, on which the needle $i$ is carried. The lever is tilted to bring its front arm upwardly in order to effect the cutting and lighting operations, and at the first part of this tilting the lever is moved laterally in order to bring the cigar out of the plane of the chute B, so that it may freely pass the latter. This lateral movement is accomplished in the construction shown by means of a cam N, which has a stop $m$ receiving and holding the lever L in the initial position, an initial face $n$ engaging the side of the lever above this stop, an inclined face $o$ immediately above the face $n$, and a straight face $p$ beyond the face $o$. The initial face $n$ engages the side of the lever in the inactive position of the latter, and then retains the lever laterally in position under the chute B. Immediately the lever is tilted, its side face bears against the inclined face o, which latter deflects the lever laterally to an extent sufficiently to move the upper end of the cigar M out of the plane of the chute B. Thereupon the lever meets the straight face p of the cam and rides upon the latter during the remainder of its upward tilting. To permit this side movement of the lever, it is movably mounted on a shaft P, in the construction shown by providing it with a collar q freely embracing the shaft and capable of both oscillatory and lateral independent movement thereon, but connected thereto to oscillate therewith by a yielding connection, as the coil spring r, which engages the lever at one end and is fixedly connected to the shaft at its other end. To restore the lever and preserve it against the face of the cam, a spring Q is provided coiled upon this shaft and reacting against a collar t thereon at one end, and at its other end against the hub or sleeve q of the lever, as seen in Fig. 3. This spring is compressed during the upward tilting of the lever, and expands during the downward tilting thereof to restore the lever to the initial position.

Any suitable operating device may be employed for moving the carrier C. That shown consists of a manually operated hand lever R fixed at its end to a shaft S mounted in a bearing T, and carrying at its other end a spur-gear U, which gear meshes with a gear V fixed to the shaft P on which the lever L is mounted. Thus when the lever R is depressed its gear U drives the gear V and shaft P, and the latter through the spring r tilts upwardly the lever L, which during such tilting is laterally moved by the cam N. To restore the parts to the initial position, a spring W is preferably provided, which spring engages a pin u on the gear U at one end, and a hook v on the bottom a at its other end.

The lighter E may be any suitable device capable of supplying the necessary heat to ignite the end of the cigar. I prefer the simple construction shown, in which the lighter consists of an alcohol dip w, carried by a rod x, hinged at its upper end to the outer end of the front part j of the lever, at such a point that as the lever is raised the lighter will be drawn out of the alcohol vessel y, in which it is immersed in the liquid, will be moved in proximity to a suitable igniter, as the gas jet F, by which its contents will be ignited, and will then be moved in proximity to the outer end of the cigar. By the disposition shown, the dip w will swing toward the lever as the front end of the latter is elevated, and will contact therewith as the lever approaches the vertical position, when the dip will stand opposite or slightly below the end of the cigar and at the opposite side of the lever, thus bringing its plane close to the cigar.

The cigar is taken by the carrier from the chute B to the cutter and draft inducer.

The cutter G may be any suitable automatically operated device capable of severing the tip of the cigar. I prefer to provide a combined cutter and draft inducer operating successively to first cut and then induce a draft through the cigar. That shown consists of a tip holder X having a flaring mouth, and a contracted tip hole z through which the tip of the cigar passes to the extent of the portion which it is desired to remove, and in which it is held opposite the cutting edge a' until the latter has passed and cut off the tip.

Preferably the mouth X is formed on the side of a cylindrical tube b' constituting the casing of the suction device H, and the hole z leads to the interior of this tube or casing beneath the knife edge a', which latter is movably mounted within the casing by being fixed to a piston Y having a cupped leather packing making a substantially airtight fit with the interior of the casing during the movement of the piston in the downward direction. This piston and the knife edge a' are moved downwardly together during and after insertion of the tip of the cigar into the mouth X, and the cutter first cuts the cigar and then as the piston passes beneath the mouth, the vacuum within the casing above the piston causes an induced current of air to flow through the cigar, which current being induced at the time that the lighter is adjacent to the opposite end of the cigar, serves to cause the lighting of the latter.

I prefer to provide the suction device with a discharge outlet f', externally of the case, which outlet is controlled by a check valve g' against an inward current, and serves to discharge the smoke drawn into the casing b' where this smoke can be seen by the person operating the device.

Any suitable arrangement for moving the cutter and operating the suction device may be employed, but I prefer to operate both through the medium of the carrier or its operating mechanism. To this end I affix on the shaft P a rear arm l and connect its end through a link h' with the piston Y, whereby the latter must follow the movement of the arm l downwardly as the carrier moves upwardly, and upwardly during the reverse movement. By this means as the lever L tilts during the carrying of the cigar to the cutter and into the latter, the arm l and piston Y will be drawn down. The piston is disposed at such distance from the hole z that the cutting edge a' will not reach this hole until the shortest cigar has been well seated therein, which requires in this construction a quarter swing of the carrier. During the carrying of the cigar to the hole z the carrier and arm l move together, the latter being positively moved by the shaft P, but when the tip of the cigar is fully seated in the hole it resists further movement of the carrier C and hence the latter remains stationary, while the shaft continues to turn, the yielding spring r permitting this, and as the arm l is turned downward with this further movement of the shaft it draws down the piston Y until the knife edge a' has pressed and cut the tip, and the piston has gone below the hole $z$, thus permitting the vacuum in the casing $b'$ to act to create an induced draft through the cigar. This draft occurring while the lighter E is at the outer end of the cigar is sufficient to effect the ignition of the cigar. The piston will be retained in the downward position until the lever R is released when the spring W will restore all the parts, and as the piston rises the smoke drawn into the casing $b'$ will be discharged through its outlet $f'$.

I provide an annunciator $A'$ for indicating the completion of the cutting and lighting operation. This preferably consists of a bell $m'$ fixed to the post $n'$, and operated by a hammer $p'$, pivoted at $q'$, and normally disposed and maintained slightly out of contact with the bell by its own gravity, but having a nose $r'$ which is struck by and arrests the descent of the piston Y, and which under the impulse of this blow tilts the hammer $p'$ suddenly against the periphery of the bell. Upon hearing the sound of the bell, the operator will release the handle R, whereupon the spring W will restore the apparatus to the original position.

A suitable detacher for freeing the cigar from the holder is now required. That shown consists of a slender spring catch I mounted at its lower end on the bottom $a$, and extending upwardly at the side of the carrier in such position that the latter bears against its side edge $s'$, when laterally displaced, and rides up this side edge during the major portion of the upward tilting of the front end of the lever L, and in so doing passes a shoulder $t'$ of the detacher, which shoulder is disposed at a distance from the mouth X exceeding the greatest length of the largest cigar, and is adapted to catch the head end of the cigar as the latter moves away from the mouth after the cutting and lighting operations, and when so catching the end of the cigar will arrest the latter, whereby the further downward movement of the arm $j$ of the lever will withdraw its needle $i$ from the end of the cigar and permit the cigar to fall. To guide the cigar when thus freed, the detacher I is provided with a spoon-shaped end $u'$ embracing the body of the cigar, and tending to cause its projection toward the chute J when it is freed. The spring $s'$ is of such slight tension that it yields and permits the passage of the cigar as the latter moves toward the cutter.

The discharge chute J is disposed beneath and at the side of the position occupied by the cigar immediately after the latter leaves the cutter, and is of such shape to catch the cigar as it is detached from the carrier, and guide it out of the device to the lip K. Preferably the chute J is an open inclined channel, narrow at its upper end $v'$, and of a width exceeding the length of the largest cigar at its lower end $w'$, whereby during transit of the chute by reason of its tapering shape in rolling down the chute turn from the endwise to the sidewise position therein as it rolls out through the discharge orifice $x'$ to the lip K.

In operation the cigar is dropped in the chute B head first, falling onto the needle $i$ of the carrier, by which it is held with sufficient firmness for the subsequent operations. The hand lever R is then depressed, which moves the carrier upwardly and laterally, presenting the tip of the cigar to the mouth X, by which it is guided to the tip hole $z$. During this operation the lighter E is carried to the head end of a cigar, where it is maintained until the cutter and suction have operated. As the carrier tilts upwardly the rear arm $l$ on the shaft P draws down the piston Y. When the tip of the cigar is forced into the hole $z$ the carrier ceases to move, but the arm $l$ continues to draw down the cutter and the piston Y, until the cigar is cut and the draft through it produced, whereupon the cigar is lighted. The piston moves downwardly until stopped by striking the toe $r'$ of the bell hammer. On striking this toe it and the bell hammer are tilted to ring the bell $W'$, which announces the completion of the operation of the device, whereupon the user will release the hand lever R, which together with the other mechanism will be restored to the initial position by the spring W. In this restoration the detacher I will remove the lighted cigar from the carrier and the cigar will fall into the trough J and be discharged therefrom onto the lip K. As the mechanism is restored the piston Y will move to the position for the next cutting operation. In this movement the accumulated smoke above the piston will be driven out through the outlet $f$.

Provision for different lengths and sizes of cigars is made in the construction shown by cutting away the portion $g$ from the chute B sufficiently to permit the exit of any cigar, and by flaring the mouth X sufficiently to meet the tip of either a long or short cigar and guide the same into the tip hole $z$. With a long cigar the movement of the carrier is less than with a short cigar, and consequently the yielding of the spring $r$ in such a case is somewhat greater than when the carrier has its full movement, but the spring is arranged to permit a sufficient farther movement of the arm $l$ to cut and induce a draft through the cigar even when the movement of the carrier is limited by the unusual length of the cigar.

It will be seen that my invention provides an apparatus for automatically cutting and lighting cigars which can be variously availed of, either in the form shown, or in any suitable modifications thereof, for the convenient, automatic cutting and lighting of the cigar and the delivery of the latter after these operations.

It will be understood that the invention is not limited to the particular details of construction and operation set forth as its preferred form, but that it may be employed in whole or in part according to such modifications of these features as circumstances or the judgment of those skilled in the art may dictate.

What I claim is—

1. In a machine for cutting cigars, a movable carrier receiving and retaining the cigar, and a movable cutter for the cigar operated by the movement of said carrier, said carrier presenting the tip of the cigar to said cutter prior to the operation of the latter and said cutter moving past the cigar to cut it.

2. In a machine for cutting cigars, a movable carrier receiving and retaining the cigar, a cutter for the latter, said carrier presenting the tip of the cigar to said cutter, and a disengaging device engaging the cigar after the cutting operation and removing it from the carrier.

3. In a machine for cutting cigars, a carrier receiving the cigar, a cutter for the latter, said carrier movable and when moved presenting the tip of the cigar to said cutter, means for operating the latter and an annunciator indicating the completion of the cutting operation.

4. In a machine for lighting cigars, a carrier receiving and retaining a cigar and movable therewith, a suction device inducing a draft through the cigar, said carrier movable and when moved presenting the cigar to said suction device, and a lighter adjacent to the head end of the cigar when the latter is acted on by said suction device.

5. In a machine for lighting cigars, a carrier for the cigar, means for inducing a draft through the latter, said carrier movable to present the cigar to said draft inducer, and a lighter movable toward the head end of the cigar, substantially as and for the purpose set forth.

6. In a machine for lighting cigars, a movable carrier receiving and carrying a cigar, means for inducing a draft through the latter, said carrier presenting the tip end of the cigar to said draft inducer, a lighter adjacent to the head end of the cigar while the latter is acted on by said draft inducer, and a detacher engaging the cigar and freeing it from said carrier after the lighting operation.

7. In a machine for cutting and lighting cigars, a chute B, a carrier C opposite the latter, receiving the cigar therefrom and movable with the latter, a cutter G to which the cigar is presented by said carrier, a draft inducer H for creating a draft through the cigar, a lighter E movable into proximity with the head end of the cigar, a detacher I for freeing the cigar after lighting, and a delivery chute J for delivering the lighted cigar, substantially as and for the purpose set forth.

In witness whereof I have hereunto signed my name in the presence of two subscribing witnesses.

JOHN J. O'NEILL.

Witnesses:
GEORGE H. FRASER,
THOMAS F. WALLACE.